United States Patent [19]
Glonner

[11] Patent Number: 5,748,112
[45] Date of Patent: May 5, 1998

[54] POSITION RECOGNITION ARRANGEMENT FOR A SELECTOR LEVER IN MOTOR VEHICLES

[75] Inventor: Hans Glonner, Pfaffenhofen, Germany

[73] Assignee: Bayerische Motoren Werke Aktiengesellschaft, Munich, Germany

[21] Appl. No.: 664,194

[22] Filed: Jun. 10, 1996

[30] Foreign Application Priority Data

Jun. 22, 1995 [DE] Germany .......... 195 22 656.9

[51] Int. Cl.⁶ .......... H03M 1/22
[52] U.S. Cl. .......... 341/17; 341/16
[58] Field of Search .......... 341/1, 3, 6, 7, 341/11, 13, 15, 16; 324/207.24

[56] References Cited

U.S. PATENT DOCUMENTS 5,370,015  12/1994  Moscatelli .

FOREIGN PATENT DOCUMENTS

| 38 41 373 A1 | 7/1989 | Germany . |
| 43 34 912 C1 | 10/1993 | Germany . |
| 43 29 584 A1 | 3/1994 | Germany . |
| 195 06 159 A1 | 2/1995 | Germany . |

*Primary Examiner*—Brian K. Young
*Attorney, Agent, or Firm*—Evenson, McKeown, Edwards & Lenahan, P.L.L.C.

[57] ABSTRACT

A position recognition arrangement for a selector lever in motor vehicles, in which a separate recognition switch is assigned to every valid and selectable position. The recognition switches are actuated simultaneously in a transition area from one position to the adjacent position. Preferably, the recognition switches are formed by mutually separate contact paths which extend in the operating direction of the selector lever, of which at least the respective adjacent contact paths are offset with respect to one another perpendicularly to the operating direction and overlap one another at least in a transition area relative to the perpendicular line with respect to the operating direction.

18 Claims, 1 Drawing Sheet

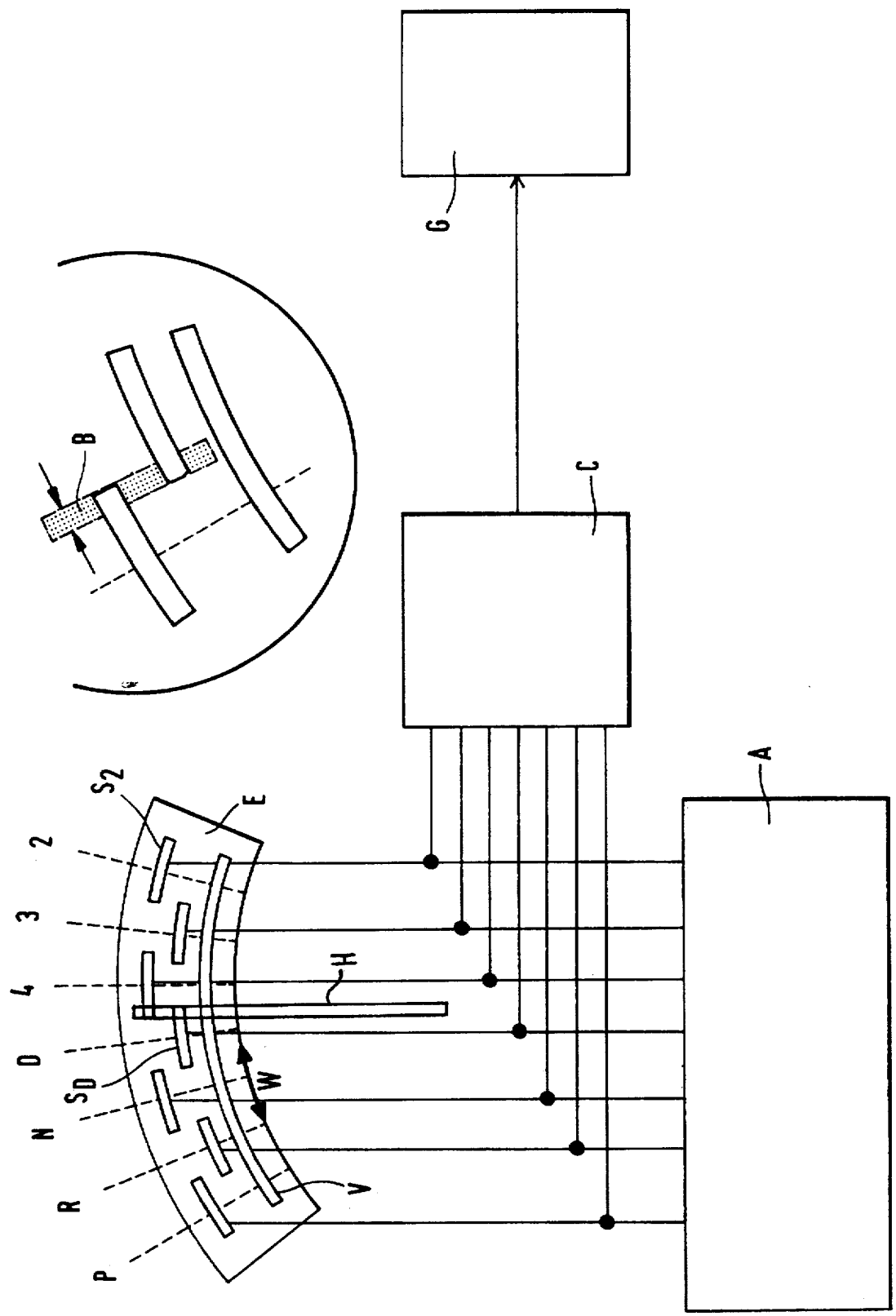

POSITION RECOGNITION ARRANGEMENT FOR A SELECTOR LEVER IN MOTOR VEHICLES

BACKGROUND AND SUMMARY OF THE INVENTION

This invention relates to a position recognition arrangement for a selector lever in motor vehicles, and more particularly to a position recognition arrangement having a separate recognition switch assigned to every valid and selectable position.

A position recognition arrangement of this type is known, for example, from German Patent Document DE 38 41 373 A1. This known position recognition arrangement is used in the case of a selector lever for an electronically controlled automatic transmission for detecting the shifting position (for example, P, R, N or D) selected by the driver. When taking into account the prior art, German Patent Document DE 38 41 373 A1 is based on a known position recognition arrangement in case of which a separate recognition switch in the form of a contact piece or a contact path is assigned to each valid and selectable shifting position. The contact pieces or contact paths are separated from one another and extend in the operating direction of the selector lever in a spaced manner on a line.

In the case of this known position recognition arrangement, when the selector lever is changed from one position to an adjacent position, a shifting condition occurs in the transition area in which no position can be recognized due to the distance between the two contact pieces assigned to the positions. Normally, the contact pieces or contact paths used as recognition switches are connected with an electronic control unit which, as a result of the shifting position of the respective contact pieces or recognition switches recognizes the momentarily selected position. If a shifting condition exists in the transition area from one position to the adjacent position in which the control unit can recognize no position, the control unit must carry out an emergency mode of operation. However, a shifting position without a recognition of a position means that the control unit has no information on the position of the selector lever. This may lead to a condition which is critical with respect to safety.

It is an object of the invention to improve a position recognition arrangement of the type generally described above such that the position of a selector lever can be detected in a reliable and consistent manner when the selector lever is being moved through a transition area between adjacent selectable valid positions.

This object has been achieved according to the present invention by providing a position recognition arrangement for a selector lever in a motor vehicle, which selector lever has a plurality of valid selectable positions, said position recognition arrangement comprising a plurality of distinct recognition switches which correspond to respective of said valid selectable positions of the selector lever, wherein one of said recognition switches and an adjacent of said recognition switches are actuated simultaneously in a transition area between a corresponding one of said valid selectable positions and an adjacent of said valid selectable positions.

According to the present invention, the recognition switches of adjacent positions are actuated simultaneously in a transition range from one position to the adjacent position. In contrast to the prior art described above, this has the advantage that, when the selector lever is in the transition area between two valid selectable shifting positions, both positions can be recognized instead of no position. Thus, the system can not only recognize errors but can also carry out a tendency-related position recognition which permits more targeted emergency running functions if, for an extended period of time, no clearly single valid position is selected.

For this purpose, for example, the contact paths of adjacent selectable positions are configured to overlap so that a movable contact piece, which is operationally connected with the selector lever and cooperates with the stationary contact paths assigned to the valid positions as the recognition switches, cooperates with the overlapping contact paths assigned to the two positions in the transition area from one position to the adjacent position. Thus, in the transition area from the previously selected position to the adjacent position to be newly selected, the recognition switches are closed simultaneously. As a result, the problem of recognizing no valid and selectable position in the transition area from one position to the adjacent position is avoided.

In addition, it is pointed out that the recognition switches may be designed in any manner, for example, also in a no-contact manner by using optical or magnetic shifting functions.

According to a preferred embodiment of the invention, the recognition switches are formed by contact paths which are separated from one another and which extend in the operating direction of the selector lever, of which at least the respective adjacent contact paths are offset with respect to one another perpendicularly to the operating direction and overlap one another at least in a transition area relative to the perpendicular line with respect to the operating direction.

It is important that, on the one hand, a separate contact path is assigned to each valid and selectable position and, on the other hand, in the transition area relative to the perpendicular line with respect to the operating direction, at least some overlapping exists in such a manner that intermediate positions between two adjacent selectable positions can be clearly recognized.

According to the invention, a particularly simple position recognition arrangement is provided in which the condition of recognizing no valid position is effectively prevented.

These and other objects, advantages and novel features of the present invention will become apparent from the following detailed description of the invention when considered in conjunction with the accompanying drawings.

BRIEF DESCRIPTION OF THE DRAWING

The sole drawing FIGURE shows a position recognition arrangement according to a preferred embodiment of the present invention.

DETAILED DESCRIPTION OF THE DRAWING

The drawing shows a position recognition arrangement which has a contact disk E which may be operatively connected with the selector lever, not illustrated here, in which case the contact piece H may be fixed. Alternatively, the contact piece H may be operatively connected with the selector lever, in which case the contact disk E may be fixed. The contact disk E extends in the operating direction W of the selector lever. A supply contact path V which extends along the whole length E is placed on the contact disk E. Furthermore, the contact disk E has seven separate contact paths. Each contact path is provided as the recognition switch for one of the valid and selectable positions P, R, N, D, 4, 3 and 2 respectively. For example, contact path $S_D$ is used as the recognition switch for position D. Contact path $S_2$ forms, for example, the recognition switch for position 2. The distinct contact paths extend in the operating direction W of the selector lever. The contact disk E and the contact piece H operatively interact by moving relative to each other in the operating direction W such that the contact piece H actuates at least one of the recognition switches in order to recognize the currently selected position P, R, N, D, 4, 3, 2.

Adjoining contact paths, for example, the contact path for position P and the contact path for position R, are offset with respect to one another perpendicularly to the operating direction W. Likewise, the adjacent contact paths for position R and position N are offset with respect to one another perpendicularly to the operating direction W. Deviating from the illustrated embodiment, all contact paths may also be offset with respect to one another in such a manner that no contact path is situated next to another contact path in the operating direction W. However, the illustrated embodiment has the advantage that the contact disk E may be manufactured to be very narrow and therefore space-saving.

The circled section of the drawing shows an enlargement of two adjacent contact paths. The two enlarged contact paths show that they overlap in a transition area B relative to a perpendicular line with respect to the operating direction W. Therefore, when the selector lever with a movable contact piece H is moved over the transition area B, the adjacent contact paths acting as recognition switches are simultaneously closed or actuated. This transition area B is preferably designed in the case of all adjacent contact paths in the overlapping manner illustrated in the enlarged section.

Each contact path assigned to a valid and selectable position, such as $S_D$ and $S_2$, is connected with a coder C. The coder C may, for example, be a microprocessor with a serial output. In the coder C, preferably a serial signal is formed originating from the shifting condition signal of the contact paths or recognition switches and is transmitted to a control unit G of an electronically controllable automatic transmission. The control unit G processes the recognized position for the shifting point control in the case of gear shifting operations in a known manner. Furthermore, the contact paths for the selectable positions may also be connected with an electric or electronic display unit A in order to be able in each case to visually display the selected position to the driver.

When the selector lever is in the transition area B between two selectable positions, for example, P and R, the electric display unit A as well as the coder C and/or the control unit G may be controlled to act according to a predetermined manner, such as, for example, described as follows. The electric display unit A as well as the coder C, in the case of a position of the selector lever in the transition area B between positions P and R, receive the shift signals of both recognition switches for position P as well as for position R. In this situation, the control unit G may, for example, maintain the control functions for the previously clearly selected position until the selector lever has moved out of the transition area B into a clearly valid and selectable position.

If the display unit A or the coder C and/or the control unit G no longer recognizes a valid and selectable position, it is contemplated to carry out a clear error recognition relative to the contact path assigned to the previously selected position. By using a corresponding error diagnosis and a corresponding emergency mode in connection with the arrangement according to the invention, the reliability and effectiveness of the position recognition arrangement and thus of the whole automatic transmission can be increased because an emergency operation can be permitted which comes closer to the normal operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A position recognition arrangement for a selector lever in a motor vehicle, which selector lever has a plurality of valid selectable positions, said position recognition arrangement comprising a plurality of distinct recognition switches which correspond to respective of said valid selectable positions of the selector lever, wherein said recognition switches of one of said valid selectable positions and said recognition switches of an adjacent of said valid selectable positions are actuated simultaneously in a transition area between said one of said valid selectable positions and adjacent of said valid selectable positions.

2. A position recognition arrangement according to claim 1, wherein said recognition switches are formed by respective distinct contact paths which extend in an operating direction of the selector lever, and wherein at least adjacent of said contact paths are configured to be offset with respect to one another perpendicularly to the operating direction.

3. A position recognition arrangement according to claim 1, wherein the recognition switches are formed by respective distinct contact paths which extend in an operating direction of the selector lever, and wherein at least adjacent of said contact paths are configured to mutually overlap at least in said transition area relative to a line perpendicular to the operating direction.

4. A position recognition arrangement according to claim 2, wherein at least adjacent of said contact paths are configured to mutually overlap at least in said transition area relative to a line perpendicular to the operating direction.

5. A position recognition arrangement for a selector lever in a motor vehicle, which selector lever has a plurality of valid selectable positions, said position recognition arrangement comprising:

a contact disk having a plurality of adjacent distinct recognition switches which correspond to respective of said valid selectable positions of the selector lever; and a contact piece which is arranged to operatively interact with said recognition switches in order to actuate at least one of the recognition switches;

wherein said recognition switches and said contact piece are configured such that said recognition switches of one of the valid selectable positions and said recognition switches of an adjacent of the valid selectable positions are actuated simultaneously in a transition area between said one of the valid selectable positions and said adjacent of the valid selectable positions.

6. A position recognition arrangement according to claim 5, wherein said recognition switches are formed by respective distinct contact paths which extend in an operating direction of the selector lever, and wherein at least adjacent of said contact paths are configured to be offset with respect to one another perpendicularly to the operating direction.

7. A position recognition arrangement according to claim 5, wherein the recognition switches are formed by respective distinct contact paths which extend in an operating direction of the selector lever, and wherein adjacent of said contact paths are configured to mutually overlap in said transition area relative to a line perpendicular to the operating direction.

8. A position recognition arrangement according to claim 7, wherein adjacent of said contact paths are configured to mutually overlap in said transition area relative to a line perpendicular to the operating direction.

9. A position recognition arrangement according to claim 5, wherein said contact disk is operatively connected to said selector lever, said contact disk being movable with respect to said contact piece to operatively interact therewith.

10. A position recognition arrangement according to claim 5, wherein said contact piece is operatively connected to said selector lever, said contact piece being movable with respect to said contact disk to operatively interact therewith.

11. A position recognition arrangement according to claim 5, wherein said recognition switches are in one-to-one correspondence with respective of said valid selectable positions.

12. A position recognition arrangement according to claim 1, wherein said recognition switches are in one-to-one correspondence with respective of said valid selectable positions.

13. A position recognition arrangement according to claim 1, wherein a single of said recognition switches corresponds to each of said valid selectable positions.

14. A position recognition arrangement according to claim 5, wherein a single of said recognition switches corresponds to each of said valid selectable positions.

15. A position recognition arrangement according to claim 1, further comprising a control unit connected with said recognition switches, said control unit detecting which of said recognition switches are actuated in order to recognize in which of the valid selectable positions or the transition areas said selector lever is located.

16. A position recognition arrangement according to claim 5, further comprising a control unit connected with said recognition switches, said control unit detecting which of said recognition switches are actuated in order to recognize in which of said valid selectable positions or said transition areas therebetween said selector lever is located.

17. A method of recognizing the position of a selector lever in a motor vehicle, which selector lever has a plurality of valid selectable positions, said method comprising:

providing a plurality of distinct recognition switches which correspond to respective of said valid selectable positions of the selector lever; and arranging said recognition switches such that the recognition switches of one of the valid selectable positions and the recognition switches of an adjacent of the valid selectable positions are actuated simultaneously in a transition area between said one of the valid selectable positions and said adjacent of the valid selectable positions.

18. A method according to claim 17, further comprising detecting which of said recognition switches are actuated in order to recognize in which of the valid selectable positions or the transition areas said selector lever is located.

* * * * *